United States Patent [19]

Bradley et al.

[11] 3,723,650

[45] Mar. 27, 1973

[54] METHOD AND APPARATUS FOR DERIVING THE VELOCITY AND RELATIVE POSITION OF CONTINUOUSLY MOVING INFORMATION BEARING MEDIA

[75] Inventors: John J. Bradley; Carl N. Schauffele; John Q. St. Clair, II, all of Rochester, N.Y.

[73] Assignee: Eastman Kodak Company, Rochester, N.Y.

[22] Filed: Oct. 22, 1971

[21] Appl. No.: 191,673

[52] U.S. Cl. ................178/7.2, 178/6.7 A, 178/17 A, 178/17 B, 178/DIG. 28, 235/61.11 B, 352/180

[51] Int. Cl. ........G06k 7/04, H04l 17/06, H04l 17/12

[58] Field of Search ...178/DIG. 28, 7.2, 6.7 A, 17 A, 178/17 B, 42, 80; 340/339; 235/61.11 A, 61.11 B, 61.11 C; 352/155, 180

[56] References Cited

UNITED STATES PATENTS

| | | | |
|---|---|---|---|
| 3,564,169 | 2/1971 | Sitz | 235/61.11 A |
| 3,611,403 | 10/1971 | Gilford | 235/61.11 C |

*Primary Examiner*—Howard W. Britton
*Attorney*—William H. J. Kline et al.

[57] ABSTRACT

Both the position and its time derivatives, such as velocity, of a continuously moving information bearing medium, such as perforated motion picture film, with respect to a predetermined position of apparatus for handling the information bearing medium are derived by a transducer with a specially shaped sensor element adapted to sense indicia, such as sprocket holes of motion picture film, carried by the information bearing medium. The sensor element includes at least first and second members located a predetermined distance apart, and the transducer is fixedly located with respect to the indicia carried by the moving information bearing medium so that the indicia successively engage the first and second members of the sensor element. The transducer derives a first signal indicative of the position of the moving information bearing medium when the indicia engages the first member. The transducer derives a second signal when the indicia engages the second member, and the velocity of the moving information bearing medium is derived from the predetermined distance and the time period between the first and second signals. The sensor may be provided with further members from which may be derived the instantaneous acceleration of the moving information bearing medium and further derivatives of the position, velocity and acceleration of the moving information bearing medium. The transducer may comprise a single piezoelectric element which is deflected by the engagement of the sprocket holes of the movie film by the first and second members of the sensor.

14 Claims, 9 Drawing Figures

JOHN J. BRADLEY
CARL N. SCHAUFFELE
JOHN Q. ST. CLAIR II
INVENTORS
BY Joseph F. Breimayer
W. H. J. Kline
ATTORNEYS

JOHN J. BRADLEY
CARL N. SCHAUFFELE
JOHN Q. ST. CLAIR II

INVENTORS

BY Joseph F. Breimayer
W. H. J. Kline

ATTORNEYS

METHOD AND APPARATUS FOR DERIVING THE VELOCITY AND RELATIVE POSITION OF CONTINUOUSLY MOVING INFORMATION BEARING MEDIA

CROSS-REFERENCE TO RELATED APPLICATIONS

Reference is made to commonly assigned, copending U.S. Pat. application Ser. No. 60,493, entitled FILM SCANNING FOR TELEVISION REPRODUCTION, filed Aug. 3, 1970, in the names of David L. Babcock and Lenard M. Metzger.

BACKGROUND OF THE INVENTION

1. Field of the Invention

This invention relates to a method and apparatus for deriving the position and a position time derivative such as velocity of a continuously moving information bearing medium with respect to a predetermined point and, more particularly, to a perforation sensor for sensing moving information bearing media.

2. Description of the Prior Art

In information storage and retrieval systems, it is common practice to record information such as stationary or moving visual images as a succession of image frames on an elongated information bearing medium, such as motion picture film. On at least one border of the motion picture film, indicia, or sprocket holes, may be provided for engagement with film driving means which are adapted to move the film past an exposure or projection aperture of a respective motion picture film camera or projector. Therefore, the image frames are successively recorded upon the motion picture film in a predetermined spaced relationship with respect to the indicia or sprocket holes of the motion picture film.

The motion picture film may be displayed by projection of the image frames on a screen or, as disclosed in the aforementioned U.S. Pat. application Ser. No. 60,493, the image frames in the motion picture film may be reproduced as video fields for color television displays. In the former mode of display of the motion picture film frame, the motion picture film is commonly advanced intermittently through a motion picture film projector by advancing apparatus that successively engages each sprocket hole of the motion picture film. In the latter mode of displaying the motion picture film, it may be desirable to continuously move the motion picture film through scanning apparatus for scanning each individual image frame of the motion picture film. Since video fields for television are repeated at 60 fields per second and the normal projection rates for motion picture film are 18 and 24 frames per second, each film frame must be scanned in a scanning aperture at least twice. Therefore, it is necessary to synchronize the television scanning fields with respect to the position of the moving image frame. As discussed at length in the aforementioned U.S. Pat. application Serial No. 60,493, such synchronization may involve the detection of the indicia or sprocket holes associated with the film frames. As disclosed in the aforementioned U.S. Pat. application Ser. No. 60,493 the sprocket holes may be sensed by a radiation source and photosensitive device of the type hereinafter described.

It is also common practice in the operation of information storage and retrieval systems to record information such as, for example, digital data, analog data, and alphanumeric characters, by forming a plurality of rows of perforations or depressions in an information bearing medium. The particular combination of perforations is indicative of such data or characters. In order to utilize the information recorded in the information bearing medium, which, in this instance, is commonly called "punched tape", the tape is placed in a tape reader which moves the tape past a perforation sensor which reads the particular combination of perforations in a predetermined direction with respect to the information bearing medium.

Various forms of such perforation sensors have been developed in the past wherein, for example, the perforations are sensed by gently urging switch actuating fingers or electrically conducting brushes against the tape where perforations may or may not be present. If a perforation is present, a finger, or brush protrudes through the perforation and actuates the switch or closes an electrical circuit for providing a signal to a translating device for translating the signal to another form useful to identify the data or characters stored on the paper tape. Other types of perforation sensors utilize a beam of electromagnetic radiation, such as visible light, aimed at the tape to pass through a perforation in the tape and impinge upon a radiation transducer which responds by generating a signal for use as desired.

A further perforation sensor known in the prior art constitutes an electromechanical transducer, such as a piezoelectric crystal, which has attached thereto a single step sensor element, the distal ends of which bear on and slide against the moving paper tape. When a perforation in the tape moves beneath the distal end of the sensor element, the end abruptly drops over the leading edge of the perforation and distorts or otherwise induces mechanical movement of its associated transducer. As the tape continues to move, the distal end of the sensor element is forced out of the perforation by engagement with the trailing edge of the perforation, and once again the sensor element distorts its associated piezoelectric transducer. By means of electrodes or other suitable current collecting means attached to the transducer, voltage signals generated by the distortion of the transducer are transmitted to a suitable electrical signal utilization apparatus. Such a paper tape reader is disclosed in U.S. Pat. No. 3,519,800 entitled PERFORATION SENSING APPARATUS.

The devices hereinbefore described for reading the perforations of paper tape memory systems or for sensing the sprocket holes of motion picture film provide only positional information with respect to the perforations or sprocket holes. Due to errors in the positional relationship of the perforations with respect to each other and the sprocket hole perforations with respect to their respective image frames, it is desirable to obtain further information relating to the velocity and/or acceleration of the moving paper tape or motion picture film. Furthermore, it may be desirable to obtain such velocity and/or acceleration information to control the driving means of the paper tape or motion picture film.

SUMMARY OF THE INVENTION

Accordingly, it is an object of the present invention to derive signals relating to the position and velocity of moving information bearing media.

Another object of the invention is to derive, at a predetermined point in the path of travel of a moving information bearing medium, signals representative of the position of indicia or perforations in said moving information bearing medium and signals representative of the velocity and acceleration of the moving information bearing medium.

These and other objects of the invention may be realized in a method and apparatus for handling an information bearing medium provided with perforations. In a preferred embodiment of the invention, the apparatus includes means for moving the information bearing medium in a path of travel, a transducer means responsive to mechanical deformation for producing a signal, first sensor element means responsive to the perforations for deforming the transducer means for producing a first signal representative of the position of the perforations with respect to the first sensor element means and second sensor element means responsive to the perforations for deforming the transducer means for producing a second signal. Furthermore, a preferred embodiment of the invention may include third means responsive to the time interval between the generation of the first and second signals for producing a velocity signal indicative of the rate of movement of the information bearing medium relative to the means.

Other objects and advantages of the invention will become apparent from the following description taken in conjunction with the accompanying drawings.

DESCRIPTION OF THE PREFERRED EMBODIMENT

Figures 1, 2A, 2B, 2C:
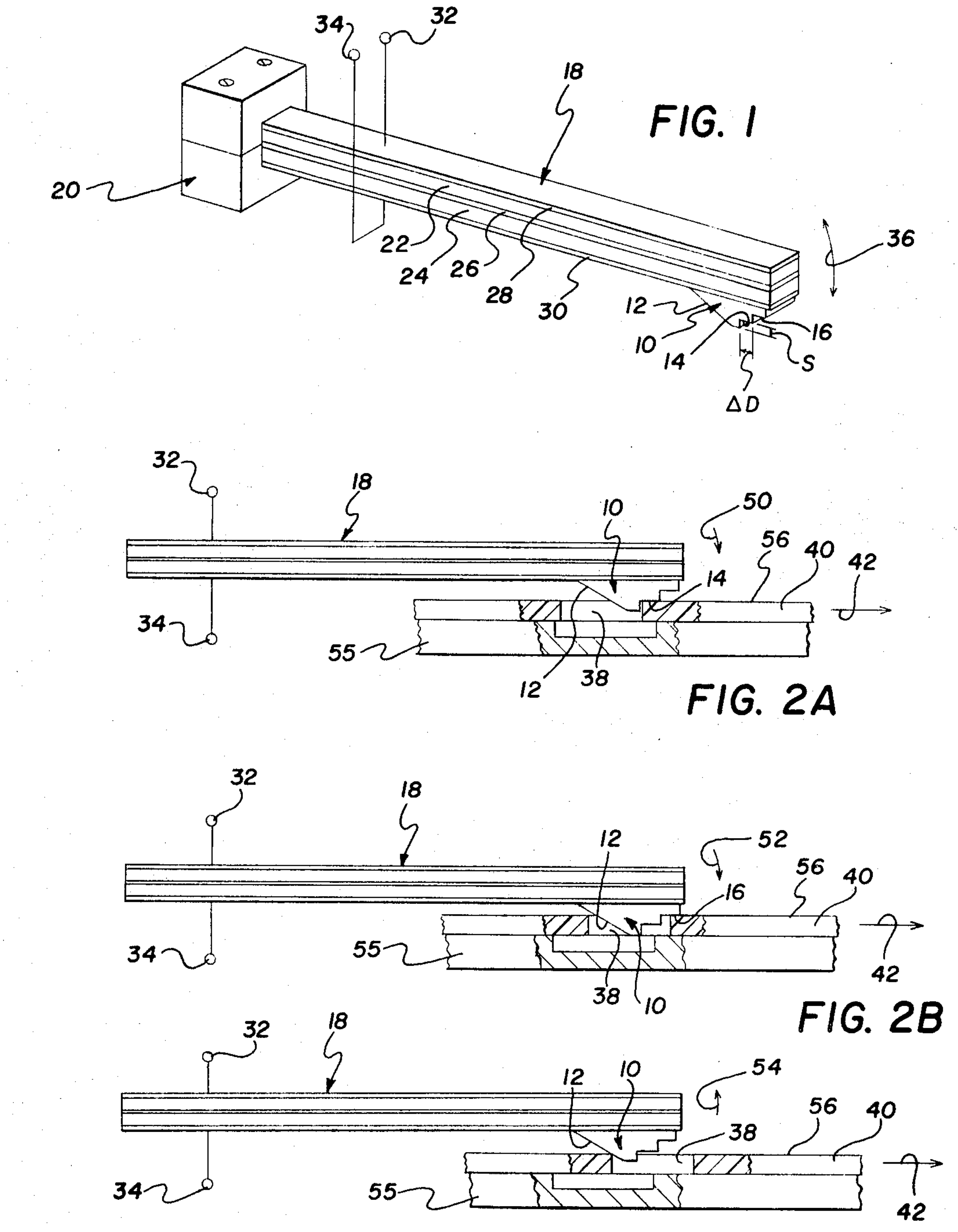
FIG. 1 is a schematic illustration in partial perspective of the electromechanical transducer and sensor element of the perforation sensor of the present invention.
FIGS. 2A–2C are plan views of the various stages of movement of a perforation of an information bearing medium past the perforation sensor of FIG. 1.

Referring now to the drawings and first to FIG. 1 as one preferred embodiment of the invention, there is shown a perforation sensor for engaging the perforations of a moving information bearing medium comprising a sensor element 10, attached to an electromechanical transducer for producing, in response to the deflection imparted to the electromechanical transducer by the sensor element 10, a first signal indicative of the position of perforations engaged by the sensor element 10, and a second signal indicative of the position/time derivatives, e.g., velocity, of the information bearing medium. The sensor element 10 is adapted to bear on and slide against a moving information bearing medium (not shown) and compresses a ramp member 12, a first step member 14 and a second step member 16. The step members 14 and 16 have a predetermined width, $\Delta$ D, and height S. The sensor element 10 may be made of a metallic or non-metallic compound that resists wear due to the moving information bearing medium bearing thereupon and which does not scratch or snag the surface of the moving information bearing medium or the apertures therein. Chrome plated aluminum or brass have been found to be suitable materials for the manufacture of the sensor element 10.

As shown in FIG. 1, the sensor element 10 is attached to the free end of the electromechanical transducer 18 which is secured at its other end in a cantilever mounting to a stationary clamping unit 20. In the disclosed embodiment, electromechanical transducer 18 may comprise a piezoelectric "Bimorph" (Reg. TM) element of the type manufactured and sold by Clevite Corporation housing first and second piezoelectric plates 22 and 24 which are adhesively attached along their common longitudinal surfaces by an adhesive layer 26. Electrodes 28 and 30 are coated or otherwise applied to the outer longitudinal surfaces of the piezoelectric plates 22 and 24 respectively. Electrical conductors 32 and 34 are attached to the electrodes 28 and 30, respectively. If the plates 22 and 24 have the same crystal orientation, a voltage signal will be produced between the electrodes 28 and 30 upon cantilever bending of the plates. Since the structure and operation of such transducers are well known in the art further description of the transducer 18 in regard to its piezoelectric response is deemed unnecessary.

The electromechanical transducer 18 operates to produce electrical signals at the electrical conductors 32 and 34 in response to bending motion in the direction of the arrow 36. The magnitude of the electrical signal is dependent upon two factors, the distance through which the free end of the transducer 18 is deflected and the abruptness of the deflection. A very slow deflection of the free end of the transducer 18 in the direction of the arrow 36 may produce a low amplitude output signal of relatively long duration; however, a very abrupt deflection of the free end of the electrical transducer 18 in the direction of the arrow 36 may produce a relatively high amplitude signal of short duration.

Figures 3, 4, 5A, 5B, 5C:
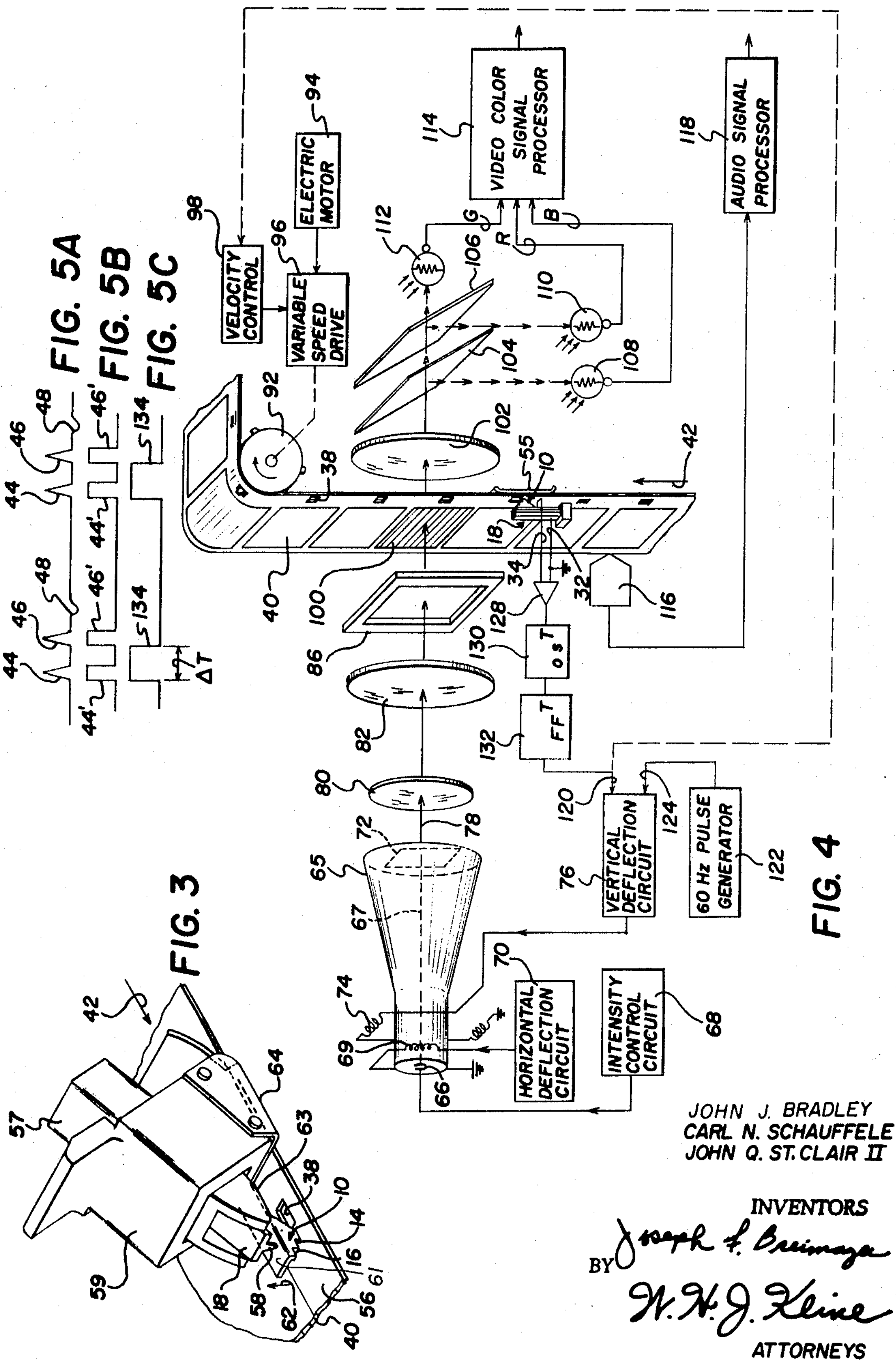
FIG. 3 is a schematic illustration in partial perspective of a preferred embodiment of the perforation sensor.
FIG. 4 is a schematic illustration in partial perspective of a film scanning system including the improved perforation sensor of FIG. 1 or FIG. 3.
FIGS. 5A–5C are wave form diagrams of signals developed by the perforation sensor of FIGS. 2 and 4.

Referring now to FIGS. 2A, 2B and 2C, there is shown, in sequence, the deflection of the electromechanical transducer 18 upon the engagement of a perforation 38 of an information bearing medium 40 traveling in the direction of the arrow 42 by the first step member 14 (FIG. 2A), the second step member 16 (FIG. 2B), and the ramp member 12 (FIG. 2C) of the sensor element 10. Also shown in FIG. 5A are the output signals 44, 46 and 48 respectively developed at the electrical conductors 32 and 34 in response to the deflection of the electromechanical transducer 18 in the direction of the arrows 50, 52 and 54 respectively.

In FIG. 2A, the information bearing medium 40 is advanced in the direction of the arrow 42 at a predetermined velocity, and the sensor element 10 bears on and slides against the surface 56 of the information bearing medium 40 at a constant force or tension imparted to the electromechanical transducer 18 and sensor element 10 by the clamping unit 20 (FIG. 1) which is oriented in a predetermined relationship with respect to the moving information bearing medium 40 and the backing plate 55. As shown in FIG. 2A, the leading edge in the direction of movement indicated by the arrow 42 of the perforation 38 has advanced until the first step member 14 of the sensor 10 has abruptly dropped in the direction of the arrow 50 to engage the leading edge of the perforation 38. The first signal 44 of FIG. 5A is generated in response to the abrupt drop of the sensor 10 in the direction of the arrow 50.

Referring now to FIG. 2B, it will be noted that the information bearing medium 40 has advanced in the direction of the arrow 42, a distance equal to the dimension Δ D of the first step member 14, and that the sensor 10 has abruptly dropped in the direction 52 until the second step member 16 has engaged the leading edge of the perforation 38. At this instant the second signal 46 of FIG. 5A is generated by the electromechanical transducer 18 across the electrical conductors 32 and 34.

The first signal 44 indicates the fact that the perforation 38 of the information bearing medium 40 has reached the point in the apparatus for advancing the information bearing medium where the perforation sensor is located. In a paper tape reader, the first signal 44 may be used to indicate the presence of a bit of information, and in the motion picture film scanning system, the first signal 44 may be used to indicate the position of the image frame associated with the sprocket hole in a manner to be more appropriately described hereinafter with reference to FIG. 3.

As shown in FIG. 5A, the second signal 46 is generated after a time delay, Δ T measured from the occurrence of the first signal 44. Since the dimension Δ D of the first step member 14 is a constant, the velocity of the moving information bearing medium 40 is therefore the length of the first step member Δ D divided by the time delay Δ T, or $V = \Delta D/\Delta T$. The dimensions S (FIG. 1) of the first and second step members 14 and 16 are made equal so that the first and second signals 44 and 46 have approximately the same voltage amplitude. The first and second step members 14 and 16 therefore provide a position and velocity measurement at each perforation 38 in the information bearing medium 40. The velocity measurement may be used in both the paper tape reader and the motion picture film scanner for regulating the drive means of the information bearing medium 40.

It will be noted that the mechanical force imparted to the electromechanical transducer 18 by the clamping unit 20 and the surface 56 of the moving information bearing medium 40 is sufficiently released at the instant depicted in FIG. 2B, so that any further movement in the direction of the arrow 52 is slight and any further signals induced in response thereto are negligible.

FIG. 2C shows the sensor element 10 as it is lifted out of the perforation 38 upon the continued advancement of the information bearing medium 40 in the direction of the arrow 42. The sensor element 10 is lifted along the ramp member 12 by the trailing edge of the perforation 38. As the electromechanical transducer 18 is lifted in the direction of the arrow 54, a third signal 48 of FIG. 5A is produced across the electrical conductors 32 and 34. The third signal 48 is of opposite polarity and has a relatively low amplitude in comparison to the first signal 44 and the second signal 46 due to the fact that the free end of the electromechanical transducer 18 is lifted rather gradually out of the perforation 38. Therefore, the ramp member of the sensor element 10 minimizes the electrical noise signals generated upon the movement of the sensor element 10 out of the perforation 38. The ramp member 12 also minimizes the mechanical shock imparted to the electromechanical transducer 18 and the danger of tearing the trailing edge of the perforation 38.

The two step members 14 and 16 of the sensor element 10 have a two-fold advantage over a single step sensor element. Although the average velocity may be obtained from a single step sensor by measuring the time interval Δ T′ from one perforation pulse to the next perforation pulse, the accuracy of the measurement is degraded by the tolerance on the perforation to perforation spacing of the information bearing medium 40. The step distance Δ D for the two step sensor element 10 of the present invention is the same for each perforation; in fact, no regular perforation spacing is required for accurate velocity sensing.

The second advantage resides in the fact that more information per unit time is generated by the two step sensor element 10 than by a single step sensor element. This is simply because two step members on the sensor element 10 provide position information twice as often as a one step sensor element. For example, with a single step sensor element, one may measure the time Δ T′ between two successive perforation signals and divide the time Δ T′ by the average distance, Δ D′, between two perforations. The resulting velocity measurement is really the average velocity over the total period Δ T′, which is much longer than the period Δ T between the first and second signals 44 and 46 shown in FIG. 2B.

The step period Δ T, however, is always smaller than the frame period Δ T′, and the velocity measurement obtained in the practice of the present invention more accurately measures the instantaneous film velocity. A three step member sensor element 10 could likewise provide instantaneous acceleration once for each perforation, and further step members can provide instantaneous third derivatives of position, velocity and acceleration.

Referring now to FIG. 3, there is shown in partial perspective a further embodiment of the present invention wherein a standard piezoelectric phonograph cartridge 57 may be employed in cooperation with a sensor element 10 that engages the perforations 38 of the moving information bearing medium and that bears against the cartridge needle 58 of the cartridge 57. The cartridge 57 may be similar to type 13T(B) manufactured by Astatic Corporation, although other cartridges or transducers including magnetic and semiconductor types may also be employed in the practice of the invention.

The cartridge 57 is mounted in a cartridge housing 59 that is fixedly located with respect to path of movement, indicated by the arrow 42, of the moving information bearing medium, which in this instance is represented as motion picture film 40. The cartridge needle 58 is mounted on the free end of the electromechanical transducer 18 in a manner well known in the art, and bears upon the surface 61 of the sensor element 10. In the position of the film 40 with respect to the sensor element 10 shown in FIG. 3, the electromechanical transducer is bent in the direction of the arrow 62. As shown in FIGS. 2A–2C, the signals 44 and 46 are developed by the electromechanical transducer 18 in response to the abrupt drop of the step members 14 and 16, respectively, into the perforation 38.

The sensor element 10 is attached to the cartridge housing 59 at the end of the integral spring member 63 by a pressure plate 64. The relative position of the sensor element 10 with respect to the cartridge needle in the direction of the arrow 42 may be adjusted before fixing the pressure plate 64 to the cartridge housing 59. In a motion picture film scanning apparatus to be described with respect to FIG. 4, the adjustment may be made to accurately position the sensor element 10 with respect to film frames being scanned by the film scanning apparatus.

The embodiment of the present invention depicted in FIG. 3 advantageously employs a standard inexpensive phonograph cartridge with the sensor element 10 depicted in FIG. 1. Furthermore, the sensor element 10 of FIG. 3 is mounted with respect to the cartridge 57 to absorb any unusual shock to the electromechanical transducer 18 by engagement of the sensor element 10 with the perforations 38 during forward or reverse movement of the film 40.

Referring now to FIG. 4, there is shown the employment of the perforation sensor of the present invention in scanning apparatus for television reproduction of motor picture film which is more particularly shown and described in the aforementioned copending U.S. Pat. application Ser. No. 60,493. In FIG. 1 there is shown a flying spot scanning system for converting images of the information bearing medium which, in this instance, comprises motion picture film 40, into video signals suitable for television transmission or direct application to a television receiver. The scanning system includes a cathode ray tube 65 having a cathode 66 that emits an election beam 67, the concentration of which is controlled by an intensity control circuit 68. A horizontal deflection yoke 69 operates in a well known manner under the influence of the horizontal deflection circuit 70 to direct the beam 67 horizontally across a scanning area 72 on the screen of cathode ray tube 65 at a scanning frequency of 15,750 Hz. A vertical deflection yoke 74 operates to deflect vertically the electron beam 67 in response to a complex vertical deflection signal generated by vertical deflection circuit 76.

The screen of the cathode ray tube 65 preferably is composed of a wide band spectral emission fluorescent material which, when excited by the electron beam 67, will produce a light spot on the tube face. The scanning area 72 preferably has a rectangular configuration as shown so that the electron beam 67 may be swept across the face of the scanning area in discrete spaced apart lines to generate a scanning light beam 78.

The light beam 78 is condensed by a lens 80 and thereafter focused by a lens 82 onto the image frames 100 of the motion picture film located at a scanning station 86.

As stated hereinbefore, the image bearing medium may take the form of, for example, color motion picture film which has been exposed in a motion picture camera and processed using known techniques. An exemplary film is commercially available Super 8 movie film. As is well known in the arts, such film is manufactured with spaced sprocket holes 38 along one side that enable the film to be advanced at a predetermined rate in a camera and exposed to record images thereon in spaced discrete image frames 100. The standard film exposure frame rate of the prior art is nominally 18 or 24 frames per second, with minor variations or fluctuations in the frame rate appearing with variations in the distance between respective sprocket holes.

The motion picture film 40 is advanced through the scanning area 86 in the upward direction indicated by the arrow 42 by sprocket wheel 92 that is driven in the clockwise direction by an electric motor 94. A variable speed drive 96 interposed between the electric motor 94 and the sprocket wheel 92 may take various forms well known to those skilled in the arts. A velocity control 98 may be operated in response to apparatus for sensing the velocity of the moving motion picture film to control the variable speed drive 96 and to regulate the rate of movement of the motion picture film.

The scanning light beam 78 passes through the image frame 100 within the scanning station 86 in a raster pattern depicted, for example, as 100 and is modulated by the colored image thereon. The modulated light beam is focused by a lens 102 and is intercepted by dichroic mirrors 104 and 106 which are effective to separate and pass the blue, red and green color components of the modulated light to respective photoresponsive devices 108, 110 and 112. The photoresponsive devices 108, 110 and 112 translate the intensity of the respective color components into electrical signals which are applied to the video color signal processor 114 of the television transmitter or receiver.

The motion picture film 40 may also have a sound track which may be detected by an audio reproduction transducer 116 and translated into audio signals for the audio signal processor 118 of the television transmitter or receiver.

The system hereinbefore described with respect to FIG. 1 is known in the prior art of telecine reproduction. The invention described in detail in the aforementioned copending U.S. Pat. application Ser. N. 60,493 pertains to a system for adjusting the scanning rate of the flying spot scanner 65 in accordance with the rate of movement of the motion picture film 40. More particularly, the rate of movement and the position of corresponding image frames in the scanning station 86 are developed as described therein in response to signal SP developed by a photosensor responding to radiation transmitted by the sprocket hole 38, and the signal SP so developed is applied to the first input terminal 120 of the vertical deflection circuit 76. A second input signal LP representative of the 60 Hz. television field rate is generated by the 60 Hz. pulse generator 122 and applied to the second input terminal 124 of the vertical deflection circuit 76. As shown in greater detail in the aforementioned U.S. Pat. application Ser. No. 60,493, the vertical deflection circuit 76 is responsive to the signals SP and LP to generate a signal having a complex vertical deflection sawtooth wave form to control the vertical deflection of the electron beam 64 in the direction of movement 42 of the motion picture film 40. Thus the vertical deflection circuit 76 automatically adapts the vertical deflection of the electron beam 64 to the frame rate of the motion picture film 40.

The signal SP developed in a manner hereinbefore described provided only positional information with respect to the sprocket hole 38. The velocity of the moving information bearing medium 40 could be obtained only over a period of advancement of the motion picture film 40 through several film frames. As described hereinbefore, this type of single step sensor may provide a velocity signal that is subject to error due to the permissible tolerances and aberrations in the spacing between successive sprocket holes. Furthermore, instantaneous changes in the rate of movement of the motion picture film 40 may not be detected until the advancement of several film frames has taken place.

Accordingly, in accordance with the teachings of the present invention hereinbefore set forth with respect to FIGS. 1 and 2A to 2C, a perforation sensor comprising the electromechanical transducer 18 and the sensor element 10 is fixedly located by the clamping unit 20 with respect to the path of travel of the sprocket holes 38 of the motion picture film 40. A backing plate 55 is located on the opposite side of the motion picture film 40 from the sensor element 10 of the perforation sensor. The electrical output conductors are applied to the input terminals of an amplifier 128 which develops the first and second signals 44 and 46 and applies them to the input terminal T of a one shot multivibrator 130 which squares the wave form of the first and second signals 44 and 46 to produce the third and fourth signals 44' and 46', respectively, shown in FIG. 5B. The third and fourth signals 44' and 46' are then applied to the terminal T of the bistable multivibrator 132 which may respond to the positive going transitions of the squared wave forms of the third and fourth signals 44' and 46' to produce the signal 134 of FIG. 5C which has a period $\Delta$ T directly related to the velocity of the moving film. The signal 134 may be converted to any suitable form in any manner well known in the art of electronic velocity measuring and control.

Thus the signal 134 carries information related to both the position and velocity of the film 40 and may be employed in the manner taught by the aforementioned U.S. Pat. application Ser. No. 60,493 to control the generation of the vertical deflection circuit of the flying spot scanner 65. Furthermore, the velocity component of the signal 134 may be applied through suitable velocity reference level comparison circuits in a feedback loop to the velocity control circuit 98 to control the rate of movement of the film 40.

As shown in FIG. 3, the perforation sensor of the present invention may be employed to determine the position and velocity of image frames in a moving information bearing medium in scanning apparatus for television reproduction of motion picture film. It will be apparent that the perforation sensor of the present invention may also be employed to determine the position and/or data content and velocity of other information bearing media such as paper tape. Therefore, the perforation sensor of the present invention could find application in perforation sensing apparatus of the type shown, for example, in the aforementioned U.S. Pat. No. 3,519,800.

Although only a single type of piezoelectric, electromechanical transducer has been described in detail herein, it will be apparent that many other types of ceramic or crystal piezoelectric transducers responsive to compression, bending or other forms of physical distortion may be substituted therefor. Furthermore, it will be apparent that magnetic, semiconductor or any other type of electromechanical transducer may be substituted therefor.

In summary, it will be readily apparent that by virtue of the novel perforation sensor disclosed herein, both the position and instantaneous velocity of moving information bearing media or other moving media may be readily and accurately ascertained.

The invention has been described in detail with particular reference to preferred embodiments thereof, but it will be understood that variations and modifications can be effected within the spirit and scope of the invention.

We claim:

1. In apparatus for handling an information bearing medium having spaced perforations, said apparatus including means for moving said information bearing medium along a path, a perforation sensor comprising:

a. transducer means for producing an electrical signal in response to a mechanical input;

b. first sensor means for engaging each perforation of the information bearing medium in a predetermined manner and for transmitting a first mechanical input to said transducer means in response to each perforation, whereby said transducer means produces a first signal in response to each perforation;

c. second sensor means fixedly located a predetermined distance, $\Delta$ D, from said first sensor means for engaging each perforation of said information bearing medium moving in said path and for transmitting a second mechanical input to said transducer means in response to each perforation, whereby said transducer means produces a second signal in response thereto.

2. The perforation sensor of claim 1 wherein said first and second sensor element means comprise first and second step members, adapted to engage the leading edge of each perforation, of a sensor element that is in continuous engagement with said information bearing medium, and wherein said sensor element further comprises a ramp member adapted to engage the trailing edge of each perforation for deflecting said sensor element out of engagement with the perforations.

3. The perforation sensor of claim 2 further comprising means responsive to the first and second signals and $\Delta$ D for producing a third signal indicative of a time derivative of movement of the information bearing medium in said path.

4. The perforation sensor means of claim 2 wherein said sensor element further comprises a ramp member adapted to engage the trailing edge of a perforation for deflecting said sensor element out of engagement with said perforation.

5. The perforation sensor of claim 2 further comprising:

a. means for retaining said sensor element in continuous contact with said transducer means, whereby the engagements of the leading edge of each perforation by said first and second step members are transmitted to said transducer means as said first and second mechanical inputs; and b. means for maintaining said sensor element in continuous engagement with said information bearing medium under a predetermined mechanical tension, whereby said transducer means sustains a predetermined mechanical deformation that is released as said first and second mechanical inputs upon engagement of the leading edge of each perforation by said first and second step members.

6. The perforation sensor of claim 5 wherein said transducer means comprises:

a. a piezoelectric element having electrical terminals thereon at which the electrical signals are generated in response to mechanical deformation of the piezoelectric element;

b. means for clamping a first end of said piezoelectric element in stationary relationship with respect to said path of travel of said information bearing medium; and c. means for attaching said sensor element to a second end of said piezoelectric element and in continuous engagement with respect to said path of travel of the information bearing medium, whereby said first and second mechanical inputs are transmitted to said piezoelectric element in response to the engagement of said leading edge of each perforation by said first and second step members of said sensor element.

7. In apparatus for handling information bearing medium having spaced perforations, said apparatus including means for moving said information bearing medium along a path, a perforation sensor comprising:

a. transducer means for producing an electrical signal in response to a mechanical input;

b. a sensor element in continuous engagement with the information bearing medium as it moves in said path, said sensor element further comprising:

1. first means for engaging each perforation of the information bearing medium moving in said path and for transmitting a first mechanical input to said transducer means in response to each perforation, whereby said transducer means produces a first signal in response thereto; and 2. second means fixedly located a predetermined distance, Δ D, from said first means for engaging each perforation of the information bearing medium moving in said path and for transmitting a second mechanical input to said transducer means in response to each perforation, whereby said transducer means produces a second signal in response thereto; and c. means responsive to the first and second signals and the predetermined distance, Δ D, between said first and second means for producing a third signal indicative of a time derivative of movement of said information bearing medium in said path of travel.

8. The perforation sensor means of claim 7 wherein said first means comprises a first step member adapted to engage the leading edge of each perforation in said path of travel, and said second means comprises a second step member located the predetermined distance, Δ D, with respect to said first step member for engaging said leading edge of each perforation.

9. The perforation sensor of claim 8 further comprising:

a. means for retaining said sensor element in continuous contact with said transducer means, whereby each engagement of the leading edge of each perforation are transmitted to said transducer means as said first and second mechanical inputs; and b. means for maintaining said sensor element in continuous engagement with said information bearing medium under a predetermined mechanical tension, whereby said transducer means sustains a predetermined mechanical deformation that is released as said first and second mechanical inputs upon engagement of the leading edge of each perforation by said first and second step members.

10. The perforation sensor of Claim 9 wherein said transducer means comprises:

a. a piezoelectric element having electrical terminals thereon at which the electrical signals are generated in response to mechanical deformation of the piezoelectric element;

b. means for clamping a first end of said piezoelectric element in stationary relationship with respect to said path of travel of said information bearing medium; and c. means for attaching said sensor element at a second end of said piezoelectric element and in continuous engagement with respect to said path of travel of said information bearing medium, whereby said first and second mechanical inputs are transmitted to said piezoelectric element in response to the engagement of said leading edge of each perforation by said first and second step members of said sensor element.

11. Apparatus for deriving the position and time derivatives of movement of a moving image bearing medium, said image bearing medium having a plurality of successive image frames disposed thereon and a corresponding plurality of perforations located in predetermined spaced relationship with respect to said plurality of image frames, said apparatus comprising:

a. means for moving, at a nominal velocity, the image bearing medium along a predetermined path;

b. transducer means responsive to mechanical deformation thereof for producing a signal;

c. a sensor element in continuous contact with the transducer means and continuously engageable with said image bearing medium in the path of travel of the perforations of said image bearing medium, said sensor element further comprising:

1. first means for engaging said perforations as said image bearing medium moves in said path of travel and for deforming said transducer means in response to each engagement of a perforation, whereby said transducer means produces a first signal in response thereto; and 2. second means fixedly located a predetermined distance,ΔD, from said first means for engaging said perforations as said image bearing medium moves in said path of travel and for deforming said transducer means in response to each engagement of a perforation, whereby said transducer means produces a second signal in response thereto;

d. scanning means for scanning, at a predetermined repetitive frequency, said image frames moving in said path of travel;

e. first control means responsive to said first signal for effecting the position of said scanning means in synchronism with the position of each image frame relative to said scanning means;

f. means responsive to the first and second signals and the predetermined distance between said first and second means for producing a third signal indicative of the velocity of movement of said image bearing medium; and g. second control means responsive to the third signal for effecting the movement of the scanning means in synchronism with the velocity of each image frame in said path of travel.

12. The apparatus of claim 11 wherein said first and second means comprise first and second step members, adapted to engage the leading edge of each perforation, of said sensor element that is in continuous engagement with said image bearing medium, and wherein said sensor element further comprises a ramp member adapted to engage the trailing edge of each perforation for deflecting said sensor element out of engagement with the perforation.

13. A method of deriving the position and velocity of a moving image bearing medium, said image bearing medium having a plurality of successive image frames disposed thereon and a corresponding plurality of perforations located in predetermined spaced relationship with respect to said plurality of image frames, said method comprising the steps of:

a. moving, at a nominal velocity, the image bearing medium in a predetermined path of travel;

b. sensing, at a first predetermined position with respect to said path of travel of said image bearing medium, the leading edge of each perforation moving in said path of travel and producing a first signal in response thereto;

c. sensing, at a second predetermined location with respect to said path of travel of said image bearing medium, each perforation moving in said path of travel and producing a second signal in response thereto;

d. scanning, at a predetermined repetitive frequency, said image frames moving in said path of travel;

e. controlling, in response to said first signal, the position of said scanning means in synchronism with the position of each image frame relative to said scanning means;

f. producing a third signal indicative of the velocity of movement of said image bearing medium in response to the first and second signal; and g. controlling, in response to the third signal, the movement of the scanning means in synchronism with the velocity of each image frame moving in said path of travel.

14. A method of deriving the position and time derivatives of movement of perforations of an information bearing medium moving at a nominal velocity along a predetermined path, said method comprising the steps of:

a. locating a first sensor element at a first predetermined position with respect to said predetermined path;

b. locating a second sensor element in a second predetermined position with respect to said predetermined path;

c. depressing the first and second sensor elements into engagement with the information bearing medium so that the first and second sensor elements undergo first and second physical displacements with respect to their first and second respective positions upon engagement of the leading edge of each perforation;

d. transducing the first and second physical displacements of the first and second sensor elements into first and second electrical signals respectively;

e. detecting the position of each perforation of the information bearing medium from the first signal; and f. detecting the velocity of the moving information bearing medium from the elapsed time period, $\Delta T$, between the occurrences of the first and second signals and from the relative distance, $\Delta D$, between the first and second predetermined positions of said first and second sensor elements, respectively.

* * * * *

'0-1050
(5/69)

UNITED STATES PATENT OFFICE
CERTIFICATE OF CORRECTION

Patent No. 3,723,650 Dated March 27, 1973

Inventor(s) J.J. Bradley, C.N. Schauffele, J.Q. StClair, II

It is certified that error appears in the above-identified patent and that said Letters Patent are hereby corrected as shown below:

| Column and Line in Printed Patent | Page or Claim and Line in Application | Mistake Noted |
|---|---|---|
| Col. 4,line 2 | Page 8, line 23 | Change "(not shown)" to --- 40 (see Figures 2A-C) --- |
| Col. 4, line 2 | Page 8, line 23 | Change "compresses" to -- comprises -- |
| Col. 8, lines 3 and 19 | Page 17, lines 9 and 23 | Change "arts" to --- art --- |
| Col. 10, line 58 | Claim 8, line 1 | Change "2" to -- 8 -- |
| Col. 11, line 24 | Claim 5, clause c), lines 2-3 | Change "continuous engagement" to -- position -- |
| Col. 11, line 25 | Claim 5, clause c), line 4 | Before the comma insert -- to engage said medium -- |
| Col. 12, line 28 | Claim 10, clause c), lines 2-3 | Change "continuous engagement" to -- position --- |
| Col. 12, line 29 | Claim 10, clause c), line 4 | Before the comma insert --- to engage said medium ---- |

Signed and sealed this 9th day of April 1974.

(SEAL)
Attest:

EDWARD M.FLETCHER,JR.
Attesting Officer

C. MARSHALL DANN
Commissioner of Patents